3,202,988
PULSE TYPE DISTANCE MEASURING SYSTEM
Paul Fombonne, Paris, France, assignor to CSF-Compagnie Generale de Telegraphie Sans Fil, a corporation of France
Filed July 17, 1963, Ser. No. 295,633
Claims priority, application France, July 19, 1962, 904,448
10 Claims. (Cl. 343—13)

The present invention relates to distance measurement by means of pulses.

The systems of distance measurement by means of pulses reduce this measurement to the measurement of the time interval separating a received pulse from a transmitted pulse. To the error, due to the fact that the two instants are not prefectly defined, there is added an error arising from the actual way the time interval is measured.

In certain cases, a signal is produced whose duration is made equal to the duration of the time interval considered by varying a voltage by means of a potentiometer. In other cases, a specific point of a reference sine wave, a zero for instance, is brought into coincidence successively with the beginning and the end of the time interval by means of a phase-shifter. The lapse of time can also be represented by the variation of a voltage, according to some specific law, from the start of the pulse. However, potentiometers or phase-shifters always depart from their theoretical law of variation and voltages never vary exactly as intended. This cause of error in the measurements of distance is often the more important.

It is an object of this invention to provide an apparatus for measuring a distance according to a method which boils down to a measurement of a frequency, a magnitude that can be measured with very high precision.

According to the invention, there is provided an apparatus for measuring the distance between a point and an object, comprising at said point: means, for transmitting pulses; means, for receiving response pulses from said object; means for generating a variable frequency wave; means for synchronizing the transmission of said pulses with fixed phase points P$e$ of cycles C$y$1 of said wave; and means for varying the frequency of said wave to bring fixed phase-points P$a$ of cycles C$y$2 of said wave into time coincidence with said received pulses, cycles C$y$2 being respectively offset with respect to cycles C$y$1 by a number N of cycles, wherein N is any integer including 0.

Preferably, P$e$ and P$a$ correspond to zeros of the reference wave. If, for example, the cycles C$y$2 coincide with the cycles C$y$1 and P$e$ is made equal to 0 and P$a$ equal to $\pi$, the required distance $d$ is given by $$2(d+d')/c = 1/2f(d)$$

where $c$ is the wave propagation velocity, $f(d)$ the value of the frequency $f$ for which the aforesaid condition is realized, and $d'$ a constant which is zero in the case of an echo and depends on the response delay in the case of an active responder.

The designation "phase point 0" will hereafter be used to denote the zeros of an oscillation corresponding to a positive derivative and "phase point $\pi$" to denote the zeros of an oscillation corresponding to a negative derivative.

The invention will be better understood and other characteristics thereof will become apparent from the following description and appended drawings in which.

The invention is applicable both to the case where the pulses received in response to the transmitted pulses are echoes, and to the case where they are obtained from an active responder, which is excited by an interrogation from the distance-meter.

As an example, the latter case will be considered.

Figure 1:
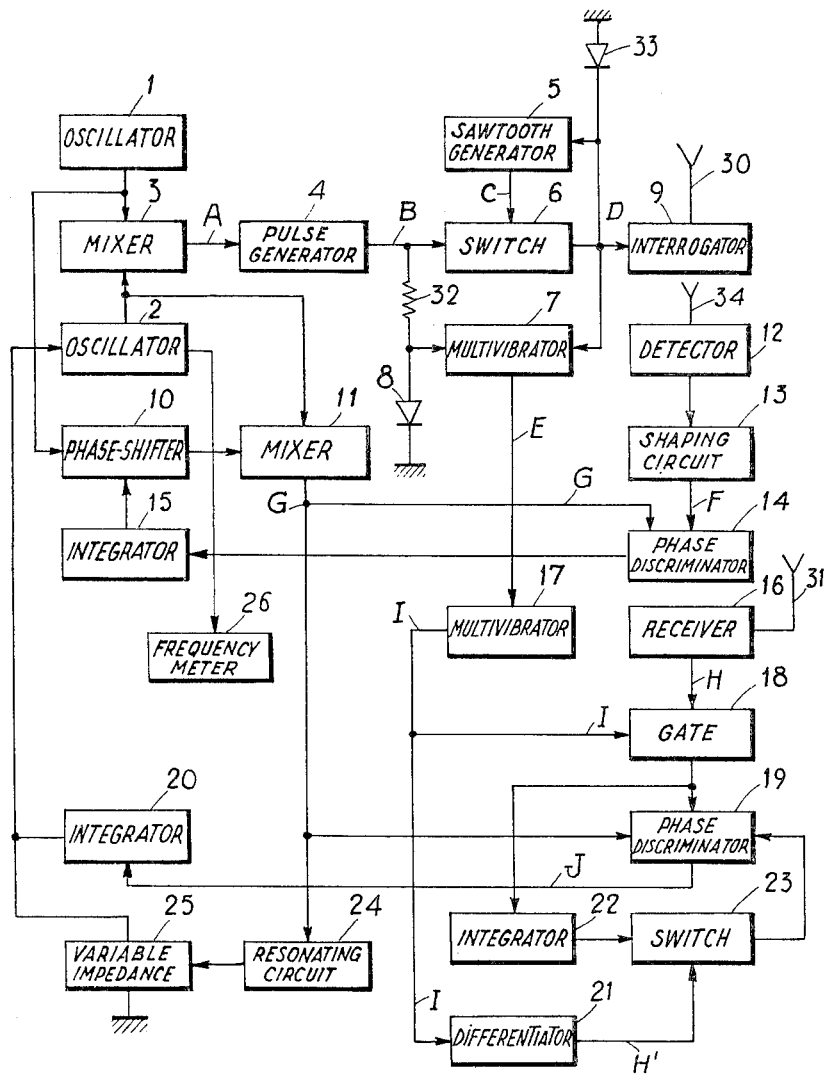
FIG. 1 is the circuit diagram of a distance measuring system according to the invention.

FIG. 1 is the circuit diagram of a distance-meter according to the invention, usable, for example, on an aircraft with a view to obtaining the distance of the latter from a responder beacon.

First a description will be given of an arrangement for obtaining pulses which coincide in time with phase O of an oscillation G of variable frequency $f$.

In this figure, a very stable generator 1, which may be a crystal controlled oscillator, produces an oscillation of a fixed frequency $f_0$. A variable frequency generator 2, whose frequency is controlled, for example, by means of a voltage, produces an oscillation of a variable frequency $f_1$. Frequently $f_0$ lies outside the range of variation of frequency $f_1$. It is assumed to be higher than frequency $f_1$.

Oscillators 1 and 2 respectively feed the two inputs of a mixer 3, which supplies an oscillation A, at the difference frequency $f = f_0 - f_1$.

This oscillation is applied at the input of a device 4, which supplies pulses B coinciding with the phases 0 (in which case they are positive) and the phases $\pi$ (in which case they are negative) of oscillation A. Device 4 may be, for example, built up by a top and bottom clipper, an amplifier and a differentiator connected in series.

Figure 2:
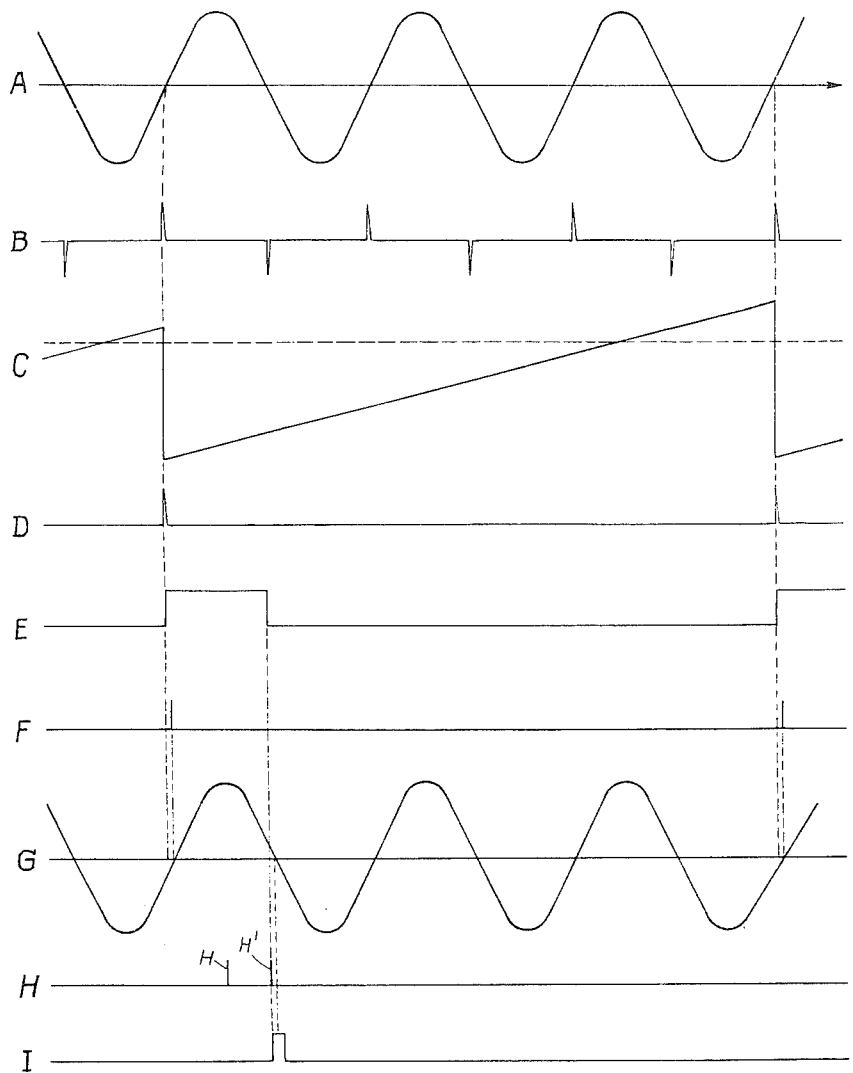
FIG. 2 represents graphs which illustrate the operation of the system of FIG. 1.

Oscillation A and pulses B are shown as a function of time, respectively at A and at B in FIG. 2.

The output of device 4 is connected through a resistance 32, to the anode of a diode 8, whose cathode is grounded; it is also connected to the signal input of an electronic switch 6, and to the first input of a bistable multivibrator 7, whose second input is connected to the output of switch 6.

The bistable multivibrator is used, in conjunction with diode 8, in a manner which will be explained later, for the generation of auxiliary signals. Switch 6 is provided with a control input connected to the output of a saw-tooth generator 5, for example, of the thyratron type. The saw-tooth signals C, supplied by generator 5, are shown at C in FIG. 2.

Switch 6 is a threshold switch, which passes pulses B applied at its signal input only if the voltage applied at its control input is higher than a given threshold, shown by the straight dotted line of FIG. 2C. The maximum voltage supplied by generator 5 is higher than that threshold.

Those positive pulses B which fail to pass through switch 6 are taken to ground through resistance 32 and diode 8, resistance 32 being made sufficiently high not to prevent positive pulses B which reach switch 6, when the latter is closed, to propagate beyond it.

Any negative pulse passing through switch 6 is taken to ground through a diode 33, whose cathode is connected to the output of switch 6 and whose anode is grounded.

Further, the output of switch 6 is connected to the control grid of thyratron 5, so that the first positive pulse B, which passes through switch 6 after the latter has closed, triggers the thyratron to start a fresh saw-tooth. Thus, switch 6 is open until the saw-tooth reaches a level equal to the threshold voltage, which closes the switch.

Switch 6 then allows again passage to the first positive pulse B appearing after the saw-tooth has reached the threshold value; this pulse initiates a fresh saw-tooth and the cycle is repeated.

FIG. 2 shows at D the pulses D selected in this way from pulses B by switch 6. Each pulse D is used for triggering the transmission of a measurement pulse.

Consequently, the constants of the thyratron circuit elements are so adjusted that the time interval between a new triggering of the thyratron and the instant when the saw-tooth attains the threshold value is at least equal to the time interval $2(d_M+d')/c$ which separates the emission of a measurement pulse from the instant when the response pulse is received for the maximum distance $d_M$ to be covered by the system. This ensures that two pulses D, whatever the value of frequency $f$, will be separated by at least that time interval.

The output of switch 6 is connected to an interrogator 9, which each of pulses D causes to transmit a high-frequency pulse, radiated by means of an antenna 30. Of course, the circuits of interrogator 9 delay by a slight time interval $r$ each of the measurement pulses with respect to the corresponding pulse D, so that the transmitted pulses no longer coincide with phase points 0 of oscillation A.

A device is therefore provided to supply a wave G having at all times the same frequency as wave A, but delayed with respect therewith so that the transmitted pulses may coincide with phase points 0 of wave G which will then be said to be "in phase" with the transmitted pulses.

To this end, a small local antenna 34 picks up the transmitted pulses and passes them to a detector 12 which converts them to video frequency pulses F, synchronous with the transmitted pulses. Pulses F are preferably shaped in a circuit 13 which is connected to the output of detector 12. They are shown schematically by vertical lines in FIG. 2F.

The required wave G could not be conveniently obtained by delaying an oscillation of frequency $f$ collected at another output of mixer 3, due to the fact that frequency $f$ is variable. An artifice is therefore used which consists in changing the phase of the wave at the fixed frequency $f_0$, the mixing of this phase-shifted oscillation at frequency $f_0$ with the oscillation at the variable frequency $f_1$ supplying an oscillation G at frequency $f$ with the desired phase-shift.

To this end, the output of oscillator 1 feeds, in addition to mixer 3, the signal input of a phase-shifter 10 of known type (e.g. of the type using variable capacity diodes), which imposes a phase-shift, whose value depends on the level of a direct current voltage (positive in the present case) applied to its control input.

This control voltage is obtained as follows:

The output of phase-shifter 10 feeds one input of a mixer 11, whose other input is fed, in phase with mixer 3, by oscillator 2 at frequency $f_1$. Mixer 11 supplies wave G at frequency $f_0-f_1$, which, when the desired balance is achieved, has to be in phase with pulses F. The output of mixer 11 is connected to one of the inputs of a circuit 14, to the other input of which pulses F are applied. Circuit 14 may be any circuit of known type supplying at its output a positive or a negative pulse according to whether the signals simultaneously applied to its two inputs are of the same polarity or of opposite polarities, and supplying no signal when at least one of these signals is zero; it may be a simple phase discriminator, but could also be a more complex circuit. Under these conditions, circuit 14 supplies, for each pulse F, a positive or a negative pulse depending upon whether wave G leads or lags with respect to pulses F, meaning by this that pulses F are produced slightly after or slightly before a 0 phase point of wave G.

The output pulses of circuit 14 are integrated in an integrating device 15. Since wave G is initially slightly leading on pulses F, circuit 14 supplies positive pulses which progressively charge integrator 15, whose output voltage acts on phase-shifter 10 so that wave G is phase-shifted by an angle $P_r=2\pi.f.r$, where $r$ represents the time interval between pulses D and pulses F. The phase-shift applied in this way is later slightly corrected in order to maintain the desired phasing by means of the pulses, now positive or negative, as the case may be supplied by circuit 14 and modifying the positive charge of integrator 15. Thus this device secures the adequate phasing of wave G with pulses F, whatever the frequency $f$ may be. In FIG. 2G, wave G is shown after this phase concordance has been established.

The distance measurement is now effected by so varying frequency $f$ that the corresponding half-period $T/2$ is equal to the time interval between the transmission of the interrogating pulse and the reception of the response pulse. It should be noted that by virtue of the precaution taken for the time interval which separates pulses D, a response pulse will correspond to the last transmitted pulse. When the above condition is met, the required distance $d$ will be given by $$2(d+d')/c = T/2 = 1/2f \text{ or } d = \frac{c}{4f} - d'$$

In the present embodiment, the adjustment of wave G in frequency occurs by means of short gating pulses I. Pulses I are approximately centered respectively on phase points $\pi$ following phase points 0 of wave G coincident with a pulse F. Frequency $f$ is then so varied that first the received pulses occur during the gating pulses. Frequency $f$ is then adjusted more accurately by direct comparison between the received pulses and wave G.

Gating pulses I are derived from the trailing edge of pulses E which are generated by means of the bistable multivibrator 7.

Multivibrator 7 supplies, in its first stable state, a positive output voltage, and no voltage in its second stable state. It is of the type including a first and a second input having the same action on the multivibrator, and trips into its first state, if not already in that state, for a positive pulse applied to one or the other of its inputs, and into its second state, if not already in that state, for a negative pulse applied to one or the other of its inputs. Its first input is connected to the input of switch 6, and its second input to the output of that switch. Just before the arrival of a pulse D to the output of switch 6, multivibrator 7, as will be seen later, is in its second state. The application on its second input of a pulse D, which has passed through the switch, trips it into its first state, and it is brought back to its second state by the application on its first input of the negative pulse B which follows that pulse D. This produces a pulse E, shown on FIG. 2E. The leading edge of the pulse coincides with a phase-point 0 of wave A, and its trailing edge with phase-point $\pi$ which follows.

The multivibrator does not trip again before a fresh pulse D appears at the output of switch 6, for the negative pulses are unsuitable for tripping it back, and positive pulses B are prevented from acting on its first input, due to the fact that they are taken to ground by diode 8.

Thus, for each pulse D, one pulse E is obtained at the output of multivibrator 7. The latter is connected to the input of a monostable multivibrator 17. The duration of the quasi-stable state of the latter is about twice the time interval $r$ between pulses D and pulses F. In addition, monostable multivibrator 17 is so adjusted as to trip into this quasi-stable state under the action of the trailing edge of pulses E. This generates gating pulses I, shown in FIG. 2 I. Half of the duration of pulse I extends over a time interval of the order of $r$ after their leading edge, and thus the middle thereof coincides approximately with phase-points $\pi$ of wave G, since these phase-points are delayed by $r$ with respect to phase-points $\pi$ of wave A.

Response pulses H picked up by antenna 31, and supplied at video frequency with positive polarity by receiver 16, are applied to the first input of a coincidence circuit 18, whose second input is connected to the output of monostable multivibrator 17 to receive gating signals I.

If circuit 18 passes pulses H, in other words if pulse H occur within the duration of the gating pulses I, these pulses are used, as will be explained later, in a circuit comprising a circuit 19, which is of the same kind as circuit 14, and is in addition supplied with wave G, and an integrator 20, whose output signal is applied to oscillator 2 with a view to obtaining a fine adjustment of frequency $f$, with the effect of bringing pulses H into exact coincidence with phase-points $\pi$ of wave.

But if the starting value of frequency $f$ has an arbitrary value, pulses H will generally fail to occur within the duration of gating pulses I, and since the output of circuit 18 will thus supply no signal, the first input of circuit 19 receives no signal and the adjustment device for frequency $f$ mentioned in the preceding paragraph does not operate.

A coarse adjustment device is therefore provided to ensure, first and as definitely as possible, that pulses H occur within the duration of the gating pulses I.

The principle consists, for measuring a distance $d$, in starting from the minimum frequency $f_m$ corresponding to a maximum period $T_M = 1/f_m$, this period $T_M$ being related to the maximum distance $d_M$ for which the system is designed by the relation $2(d_M + d')/c = T_M/2$.

Under these conditions, pulses H can only occur within the duration of the gating pulses I centered on phase-points $\pi$ of wave G (theoretical case in which $d$ is very close to $d_M$) or be ahead of these pulses. In the latter case, it is required to reduce T gradually, through increasing $f$ until pulses H occur within the duration of pulses I.

Oscillator 2 is so designed that, when the control voltage applied to it is zero, it oscillates at the maximum frequency $f_1$, i.e. $f_{1m}$ related to frequency $f_m$ by the relation $f_m = f_0 - f_{1M}$, and that the application to this oscillator 2 of a positive control voltage lowers frequency $f_1$ all the more as this voltage increases.

When the system is switched on, integrator 20 is discharged; the control voltage applied to oscillator 2 is zero, and oscillator 2 then oscillates at frequency $f_{1M}$; $f_1$ must now be gradually decreased.

Pulses H fail to pass through the coincidence circuit 18 and so are not applied to circuit 19. Recourse is now had to artificial pulses H', which are ahead of phase-points $\pi$ of wave G, but are sufficiently close to them for circuit 19 to function correctly.

These pulses H' are obtained by differentiating the leading edge of pulses I in a circuit 21, which is fed by the monostable multivibrator 17, circuit 21 including a differentiator and a diode.

FIG. 2H shows a pulse H' and also a pulse H received at a given instant during this first step of the measurement process. Pulses H and H' are shown schematically by a simple vertical line.

Pulses H' are applied to circuit 19 through an electronic switch 23, whose signal input is connected to the output of circuit 21. Switch 23 is closed when no voltage is applied at its control input connected to the output of an integrator 22. Integrator 22, whose input is connected to the output of coincidence circuit 18, is discharged when the system is switched on, and remains discharged as long as circuit 18 supplies no output signal. So switch 23 is initially closed.

As stated above, circuit 19 is of the same type as circuit 14, that is to say it delivers an output signal which is positive or negative, depending on whether the signals applied simultaneously to its first and second inputs are of the same polarity or of opposite polarities, and which is zero if one of its input signals is zero. But, to insure its initial operation with pulses H', circuit 19 contains, in addition to its "second input" which receives wave G supplied by mixer 11, and its "main first input" connected to the output of circuit 18, an "auxiliary first input" connected to the output of switch 23.

The first main input and the first auxiliary input are connected together by an appropriate arrangement in circuit 19 so that the latter may function in an equivalent manner with pulses applied either to its main first input or to its auxiliary first input.

Thus, initially it functions with pulses H' applied to its first auxiliary input; since these pulses are ahead of phase-points $\pi$ of wave G, circuit 19 delivers, for each pulse H', a pulse J which is positive and gradually charges integrator 20, whose output signal gradually causes $f_1$ to decrease, thus increasing $f$.

This has no effect on the coincidence obtained between the transmitted pulses and phase-points 0 of wave G, since pulses D are coincident, on account of their mode of production, with phase-points 0 of wave A and since the phase control applied to wave G automatically brings pulses F into phase with wave G.

Further, due to their mode of production gating pulses I are locked to phase points $\pi$ of wave G on which points they remain centered.

In their displacement they "drag" pulses H' locked to their leading edge so that pulses H' are always ahead of phase-points $\pi$ of wave G and go on increasing the charge of integrator 20 by positive pulses thus reducing frequency $f_1$.

Since, on this account, period $T = 1/f = 1/(f_0 - f_1)$ continuously decreases, there necessarily comes a time when pulses H occur during the duration of the gating pulses. They first coincide with the leading edge of the gating pulses I and, at least initially, their action is in the same sense as that of pulses H'.

Since the role of the latter has come to an end, their action on circuit 19 has to be discontinued. This is done in the following way:

Pulses H which have passed through the coincidence circuit 18 are not only applied to circuit 19 but are also integrated in integrator 22, which soon delivers a sufficient voltage to open switch 23.

From that instant circuit 19 is caused to operate only with pulses H; due, in particular, to the period of their operation jointly with pulses H', pulses H may now be slightly ahead of or slightly behind phase-points $\pi$ of wave G. Since discriminator 19 supplies positive or negative pulses according to whether the first or the second case obtains, the positive charge of integrator 20 will finally become adjusted to a level suitable for the frequency $f$ to have value $f(d) = f_0 - f_1(d)$ bringing pulses H into coincidence with phase-points $\pi$ of wave G.

This frequency $f_1(d)$ is measured, for example, by means of a frequency-meter 26 driven from an auxiliary output of oscillator 2. Frequency-meter 26 may be graduated in values of $$d + d' = \frac{c}{4(f_0 - f_1)}$$

where $d' = ct'/2$, $t'$ being the response delay separating the reception, by the responder, of the interrogation pulse from the transmission of the response pulse, which delay is predetermined for a given responder.

In this device, integrator circuits 20 and 22 operate as memory devices respectively feeding the control input of oscillator 2 and the control input of switch 23. When the received pulses disappear, integrator 20 loses the stored information only with a certain time constant. As to circuit 22, it also has a certain time constant and authorizes a resumption of search, by closing switch 23, only after a certain time interval.

If, for any reason this research produces no result, frequency $f$ increases continually. The search cycle is then resumed completely by means of the following arrangement:

The output of integrator 20 is connected to ground or to a negative point by a device 25 which is provided with a control input.

The impedance of this device 25 is normally infinite, but becomes a short-circuit when an alternating voltage of sufficient amplitude is applied to its control input. The latter is connected to a resonant circuit 24, which is itself connected to the output of mixer 11.

Figure 3:
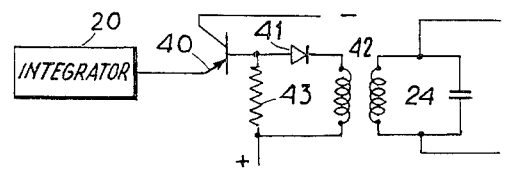
FIG. 3 illustrates a detail of the system of FIG. 1.

FIG. 3 shows an embodiment of circuit 25 which makes it possible to connect the output of circuit 20 to a point at negative potential. Circuit 25 includes a transistor 40 whose emitter is connected to the output of integrator 20, its collector being connected to a negative voltage source, and its base to a positive voltage source through a parallel circuit, one arm of which consists of a resistance 43 and the other of a series circuit including an inductance coil 42 and a diode 43, whose anode is connected to the base of transistor 40. Inductance coil 42 is coupled to the inductance coil of resonant circuit 24 which comprises an inductance coil and a capacitor in parallel.

The source of positive voltage which biases the base of transistor 40 delivers a higher voltage than the maximum output voltage from integrator 20, so that transistor 40 is normally blocked. When a high amplitude signal appears in circuit 24, i.e. at resonance, the current in the transistor base circuit, rectified by diode 44, causes a voltage drop in resistance 43 sufficient to unblock the transistor and to discharge integrator 20.

Resonant circuit 24, which is tuned to the maximum frequency $f$ used in the system, i.e. frequency $f_M$ corresponding to a maximum distance $d_m$, has one terminal connected to the output of mixer 11 and the other to ground.

It thus causes the discharge of integrator 20 when $f$ attains the value $f_M$ and resumption of the cycle at frequency $f_m = f_0 - f_{1M}$.

If search continues indefinitely with no result, this condition can be used to start an alarm signal to indicate a fault in the equipment.

If, in addition to the received pulses corresponding to the transmitted pulses, the receiver receives other pulses, for example in the case of several aircrafts interrogating the same responder beacon, these pulses will not be troublesome, since they bear no definite phase relation with the interrogation pulses from the distance-meter as the recurrence frequencies of the various distance-meters are, at balance, sub-multiples of frequencies $f$ which vary with $d$. Moreover, the search signal I makes the system sensitive to pulses picked up by antenna 31 only for a small fraction of time. However, should a spurious pulse appear in the gate, its disturbing effect would be slight, since frequency $f$ is adjusted over several repetition periods.

The invention is of course not restricted to the embodiment described and shown. In particular, it is possible to vary the ratio existing at balance between $1/f$ and $d+d'$ by altering the duration of pulses E which, in preference, should be multiples of $T/2$.

The invention is applicable to a radar, in particular to a radar altimeter.

What is claimed, is:

1. An apparatus for measuring the distance between a point and an object comprising at said point: means for transmitting pulses; means for receiving response pulses from said object; means for generating a variable frequency wave; means for synchronizing the transmission of said transmitted pulses with first points, having a first predetermined phase, of first predetermined cycles of said wave; and means for varying the frequency of said wave to bring second points, having a second predetermined phase, of second predetermined cycles of said wave into time coincidence with said received pulses, said second cycles being respectively offset with respect to said first cycles by a number N of cycles, wherein N is any integer including 0.

2. An apparatus as claimed in claim 1, wherein said response pulses are echo pulses.

3. An apparatus as claimed in claim 1, wherein said response pulses are pulses retransmitted by said object after reception of said transmitted pulses.

4. An apparatus as claimed in claim 1, wherein said second cycles coincide with said first cycles, and wherein said first predetermined phase is zero and said second predetermined phase is $\pi$.

5. An apparatus for measuring the distance between a point and an object, said means comprising at said point: means, having an output, for transmitting high-frequency pulses; means, having an output, for receiving response pulses from said object; means for generating a wave, said wave generating means comprising a frequency control input and an output; means for synchronizing the transmission of said high-frequency pulses with first points, having a first predetermined phase, of first predetermined cycle of said wave; means, coupled to said output of said wave generating means and of said pulse receiving means for generating an error signal which is zero when said received pulses coincide in time with second points, having a second predetermined phase, of second predetermined cycles of said wave, said second cycles being respectively offset with respect to said first cycles by a number N of cycles, wherein N is any integer including zero, said last mentioned means having an output coupled to said frequency control input; and means for measuring the frequency of said wave.

6. An apparatus for measuring the distance between a point and an object, said means comprising at said point: means, having an output, for transmitting pulses; means, having an output, for receiving response pulses from said object; means for generating a variable frequency and phase wave whose phase is such that said transmitted pulses coincide in time with first points, having a first predetermined phase, of first predetermined cycles of said wave and whose frequency is such that said received response pulses then coincide in time with second points, having a second predetermined phase, of second predetermined cycles of said wave, said second cycles being respectively offset with respect to said first cycles by a number N of cycles, wherein N is any integer including 0, said wave generating means comprising: a fixed frequency oscillator having an output, a variable phase-shifter having a signal input coupled to said fixed frequency oscillator output, a phase-shift control input and an output, a variable frequency oscillator having a frequency control input and an output, and a mixer having two inputs respectively coupled to said phase-shifter output and to said variable frequency oscillator output, and an output, said last-mentioned output being said wave generating means output; means coupled to said outputs of said wave generating means and of said pulse transmitting means for generating a phase error signal; means coupled to said outputs of said wave generating means and of said pulse receiving means for generating a frequency error signal; and means for respectively applying said phase error signal and said frequency error signal to said phase-shift control input and to said frequency control input.

7. An apparatus for measuring the distance between a point and an object, said means comprising at said point: means, having an output, for transmitting high frequency pulses; means, having an output, for receiving response pulses from said object; means for generating a wave whose phase is such that said transmitted pulses coincide in time with first points, having a first predetermined phase, of first predetermined cycles of said wave and whose frequency is such that said received response pulses then coincide in time with second points, having a second predetermined phase, of second predetermined cycles of said wave, said second cycles being respectively offset with respect to said first cycles by a number N of cycles, wherein N is any integer including 0, said wave generating means comprising: a fixed frequency oscillator having an output, a variable phase-shifter having a signal input coupled to said fixed frequency oscillator output, a phase-shift control input and an output, a variable frequency oscillator having a frequency control input and an output, and a mixer having two inputs respectively coupled to said phase-shifter output and to said variable frequency oscillator output, and an output, said last-mentioned output being said wave generating means output; a second mixer having two inputs respectively coupled to said outputs of said fixed frequency oscillator and of said variable frequency oscillator, said second mixer delivering a second wave; means for deriving from said second wave pulses coinciding in time with points of respective cycles of said second wave, said points having said first predetermined phase; means for applying said last-mentioned pulses to said pulse transmitting means for initiating the transmission of said high frequency pulses; means for detecting said transmitted high frequency pulses; comprising means having two inputs respectively coupled to said outputs of said wave generating means and of said detecting means, for generating a phase error signal, said comparing means having an output; integrating means having an input coupled to said comparing means output and an output coupled to said phase control input; means coupled to said outputs of said wave generating means and of said pulse receiving means for generating a frequency error signal; and means for applying said frequency error signal to said frequency control input.

8. An apparatus for measuring the distance between a point and object, said apparatus comprising at said point: means, having an output, for transmitting pulses; means, having an output, for receiving response pulses from said object; means for generating a variable frequency wave, said means having a frequency control input and an output; means for synchronizing the transmission of said transmitted pulses with first points, having a first predetermined phase, of first predetermined cycles of said wave; means having an output for generating gating signals whose respective mid-portions coincide with second points, having a second predetermined phase, of second predetermined cycles of said wave, said second cycles being respectively offset with respect to said first cycles by a whole number, which may be zero, of cycles; a gating circuit having two inputs respectively coupled to said outputs of said gating signals generating means and of said receiving means; means for generating pulses, referred to as artificial pulses, through differentiating the front edge of said gating signals; an electronic switch having an input coupled to the output of said artificial pulse generating means, a control input and an output; phase comparison means having a first input, referred to as a main first input, coupled to the output of said gating circuit, an input, referred to as an auxiliary first input, coupled to the output of said switch, an input, referred to as a second input coupled to the output of said wave generating means, said phase comparison means supplying a signal which is a function of the difference between the phase of said wave and said second to phase when one of its first inputs is fed with a pulse; an integrating circuit having an input coupled to said output of said phase comparison means, and an output coupled to said frequency control input; a second integrator having an input coupled to said output of said gating circuit and an output coupled to said control input of said switch.

9. An apparatus for measuring the distance between a point and an object, said means comprising at said point: means, having an output, for transmitting high frequency pulses; means, for receiving response pulses from said object; a fixed frequency oscillator having an output; a variable phase-shifter having a signal input coupled to said fixed frequency oscillator output, a phase-shift control input and an output; a variable frequency oscillator having a frequency control input and an output; a first mixer having two inputs respectively coupled to said phase-shifter output and to said variable frequency oscillator output, and an output, said first mixer delivering a first wave; a second mixer having two inputs respectively coupled to said outputs of said fixed frequency oscillator and of said variable frequency oscillator, said second mixer delivering a second wave; means, having an input coupled to said second mixer and an output, for deriving from said second wave a series of pulses coinciding in time with all phase points 0 and $\pi$ of said second wave; means, coupled to the output of said pulse deriving means for selecting, among said series of pulses, pulses coinciding in time with phase points 0 of said second wave and separated from each other by a time interval above a predetermined value, and for generating square wave signals respectively associated with said selected pulses, each of said square wave signals having a front edge coinciding in time with the associated selected pulse and a rear edge coinciding in time with the pulse of said series following said associated selected pulse, said last mentioned means delivering said selected pulses and square wave signals at respective outputs; means for applying said selected pulses to said pulse transmitting means for initiating the transmission of said high frequency pulses; means, having an input coupled for receiving said square wave signals, for generating gating signals of predetermined duration respectively associated with said square wave signals, the front edge of each of said gating signals coinciding in time with the rear edge of the associated square wave signal; means, having an input coupled for receiving said gating signals, for generating pulses, referred to as artificial pulses, coinciding in time with the front edge of said gating signals; means for detecting said transmitted high frequency pulses; first phase comparison means having a first and a second input respectively coupled to the outputs of said first mixer and of said detecting means, for generating a phase error signal which is a function of the phase-shift of said first wave relatively to phase 0 at the instant when said second input of said comparison means is fed with a pulse; integrating means having an input coupled for receiving said phase error signal and an output coupled to said phase-shift control input; a gating circuit having two inputs respectively coupled to said outputs of said gating signal generating means and of said receiving means; an electronic switch having an input coupled to the output of said artificial pulse generating means, a control input, and an output; second phase comparison means having a first input, referred to as a main first input, coupled to the output of said gating circuit, an input, referred to as an auxiliary first input coupled to the output of said switch, an input, referred to as a second input coupled to the output of said first mixer, and an output, said second phase comparison means supplying a signal which is a function of the phase-shift of said first wave relatively to phase $\pi$ when one of its first inputs is fed with a pulse; an integrating circuit having an input coupled to said output of said phase comparison means, and an output coupled to said frequency control input; and a second integrator having an input coupled to said output of said gating circuit and an output coupled to said control input of said switch.

10. An apparatus for measuring the distance between a point and an object comprising at said point: means for transmitting pulses; means for receiving response pulses from said object; means for generating a variable frequency wave; means for synchronizing the transmission of said transmitted pulses with first points, having a first predetermined phase of first predetermined cycles of said wave; means for varying the frequency of said wave to bring second phase points, having a second predetermined phase, of second predetermined cycles, into time coincidence with said received pulses, cycles being respectively offset with respect to said first cycles by a number N of cycles, wherein N is any integer including 0; and means for measuring the frequency of said wave.

References Cited by the Examiner
UNITED STATES PATENTS 3,030,620 4/62 Roberts et al. _____ 343—13
3,077,592 2/63 Mozley _____ 343—7.3

CHESTER L. JUSTUS, *Primary Examiner.*